(12) United States Patent
Kim

(10) Patent No.: US 10,915,140 B2
(45) Date of Patent: Feb. 9, 2021

(54) DISPLAY DEVICE

(71) Applicant: Samsung Display Co., Ltd., Tongin-Si (KR)

(72) Inventor: Se Bong Kim, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/812,712

(22) Filed: Mar. 9, 2020

(65) Prior Publication Data

US 2020/0371551 A1 Nov. 26, 2020

(30) Foreign Application Priority Data

May 20, 2019 (KR) .......................... 10-2019-0058763

(51) Int. Cl.
*G06F 1/16* (2006.01)

(52) U.S. Cl.
CPC .......... *G06F 1/1616* (2013.01); *G06F 1/1681* (2013.01)

(58) Field of Classification Search
CPC combination set(s) only.
See application file for complete search history.

(56) References Cited

U.S. PATENT DOCUMENTS

| | | | |
|---|---|---|---|
| 9,007,315 B2 | 4/2015 | Kim et al. | |
| 10,383,239 B2 | 8/2019 | Lee et al. | |
| 10,540,026 B2 * | 1/2020 | Park | H05K 5/0017 |
| 2012/0307423 A1 * | 12/2012 | Bohn | G06F 1/1652 |
| | | | 361/679.01 |
| 2016/0130849 A1 * | 5/2016 | Cheah | G06F 1/1616 |
| | | | 361/679.27 |
| 2016/0195901 A1 * | 7/2016 | Kauhaniemi | G06F 1/1681 |
| | | | 361/679.27 |
| 2017/0061836 A1 * | 3/2017 | Kim | G06F 1/1652 |
| 2017/0142847 A1 * | 5/2017 | Park | G09F 9/301 |
| 2018/0307338 A1 * | 10/2018 | Park | G06F 1/1652 |
| 2019/0018457 A1 | 1/2019 | Kim et al. | |
| 2019/0061318 A1 | 2/2019 | Jung et al. | |
| 2019/0082544 A1 * | 3/2019 | Park | H05K 5/0226 |
| 2020/0257335 A1 * | 8/2020 | Kim | H04M 1/0268 |
| 2020/0313112 A1 * | 10/2020 | Lee | G06F 1/1675 |
| 2020/0344897 A1 * | 10/2020 | Kim | G06F 1/1652 |
| 2020/0371551 A1 * | 11/2020 | Kim | G06F 1/1681 |

FOREIGN PATENT DOCUMENTS

| | | | |
|---|---|---|---|
| KR | 1020130125239 A | 11/2013 | |
| KR | 1020170093610 A | 8/2017 | |
| KR | 1020180097195 A | 8/2018 | |

* cited by examiner

*Primary Examiner* — Lisa Lea-Edmonds
(74) *Attorney, Agent, or Firm* — Cantor Colburn LLP

(57) ABSTRACT

A display device includes a display module including a first non-folding area, a second non-folding area, and a folding area disposed between the first and second non-folding areas, a support disposed below the display module, a sub-support disposed below the support, a buffer portion which is disposed between the support and the sub-support and in which an opening overlapping the folding area is defined, and a plurality of joint units disposed below the sub-support to overlap the folding area.

20 Claims, 12 Drawing Sheets

DISPLAY DEVICE

This application claims priority to Korean Patent Application No. 10-2019-0058763, filed on May 20, 2019, and all the benefits accruing therefrom under 35 U.S.C. § 119, the content of which in its entirety is herein incorporated by reference.

BACKGROUND

1. Field

Exemplary embodiments of the invention herein relate to a display device, and more particularly, to a display device in which deformation of a folding area may be prevented.

2. Description of Related Art

Electronic apparatuses, such as smart phones, digital cameras, laptop computers, navigations, and smart televisions, for providing an image to a user include a display device for displaying the image. The display device generates an image and provides the image to the user via a display screen.

Recently, with a technological development for the display device, various types of display devices are being developed. For example, various flexible display devices which may be deformed, e.g., folded or rolled in curved shape, are being developed. The flexible display devices capable of diversely changing their shapes are easily portable and may improve user's convenience.

SUMMARY

A folding display device among flexible display devices is folded with respect to a folding axis extending in one direction. However, in the folding display device, there have been previously unexpected problems such as deformation of a folding area and damage of elements due to a deformation of the folding area, and thus a development of technology to solve these problems has been desired.

Exemplary embodiments of the invention provide a display device in which deformation of a folding area may be prevented.

An exemplary embodiment of the invention provides a display device including a display module including a first non-folding area, a second non-folding area, and a folding area disposed between the first and second non-folding areas, a support disposed below the display module, a sub-support disposed below the support, a buffer portion which is disposed between the support and the sub-support and in which an opening overlapping the folding area is defined, and a plurality of joint units disposed below the sub-support to overlap the folding area.

In an exemplary embodiment, the first and second non-folding areas and the folding area may be arranged in a first direction, and the opening may have a length greater than that of the folding area in the first direction.

In an exemplary embodiment, when viewed in a second direction crossing the first direction, a boundary of the opening may be adjacent to a boundary of the folding area and may be disposed outside the boundary of the folding area.

In an exemplary embodiment, the opening may be defined inside first and second sides of the buffer portion, which are opposite to each other in the second direction.

In an exemplary embodiment, the plurality of joint units may extend in the second direction and be spaced apart from each other in the first direction.

In an exemplary embodiment, when viewed in the second direction, each of the plurality of joint units may have a reverse trapezoidal shape.

In an exemplary embodiment, the opening may be defined as a space sealed by the support and the sub-support.

In an exemplary embodiment, the buffer portion may include rubber.

In an exemplary embodiment, the buffer portion may be coated on a bottom surface of the support.

In an exemplary embodiment, the support may have a first modulus, and the sub-support may have a second modulus lower than the first modulus.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
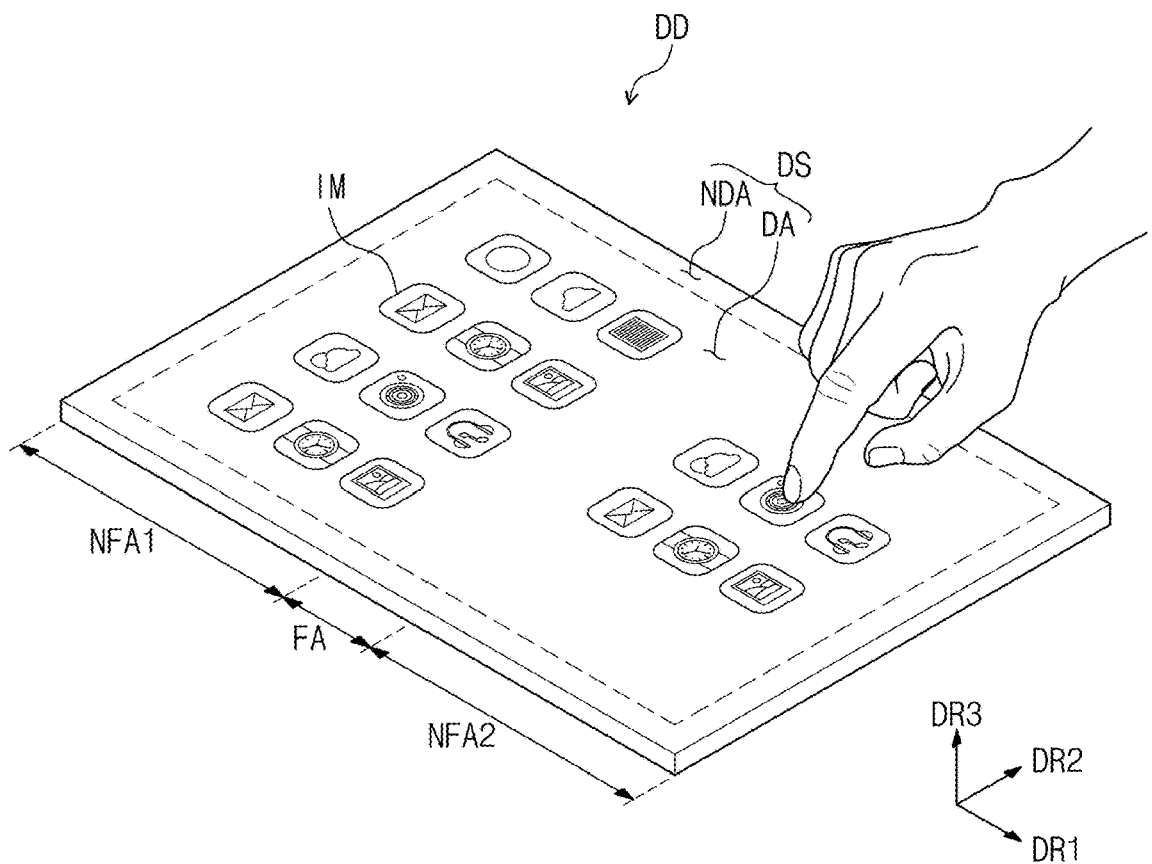
FIG. 1 is a perspective view of an exemplary embodiment of a display device according to the invention.

In this specification, when a component (or a region, a layer, a portion, or the like) is referred to as "being on", "being connected to", or "being coupled to" another component, it may be directly disposed/connected/coupled to another component, or an intervening third component may be also disposed therebetween.

Like numbers refer to like components throughout. Also, in the drawings, the thicknesses, ratios, and dimensions of the components are exaggerated for effectively describing the technical features.

"And/or" include one or more combinations in which the associated components may define.

Although the terms such as first and second are used to describe various components, these components should not be limited by these terms. The terms are only used to distinguish one component from other components. For example, a first component may be referred to as a second component, and similarly a second component may be referred to as a first component without departing from the scope of the invention. The expression of a singular form may include plural forms unless definitely indicating a particular case in terms of the context.

Also, terms of "below", "on lower side", "above", "on upper side", or the like may be used to describe the relationships of the components illustrated in the drawings. These terms have a relative concept, and are described on the basis of the directions illustrated in the drawings.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the invention belongs. Also, terms as defined in a commonly used dictionary should be construed as having the same meaning as in an associated technical context, and unless ideally or excessively construed as having formal meaning, the terms are defined apparently herein.

It should be understood that the term of "comprise", "have", or the like intends to specify the presence of a feature, a fixed number, a step, an operation, an element, a component, or a combination thereof described in the specification, but does not exclude the possibility of presence or addition of one or more other features, fixed numbers, steps, operations, elements, components, or combinations thereof.

Hereinafter, embodiments of the inventive steps will be described in detail with reference to the accompanying drawings.

Figure 2:
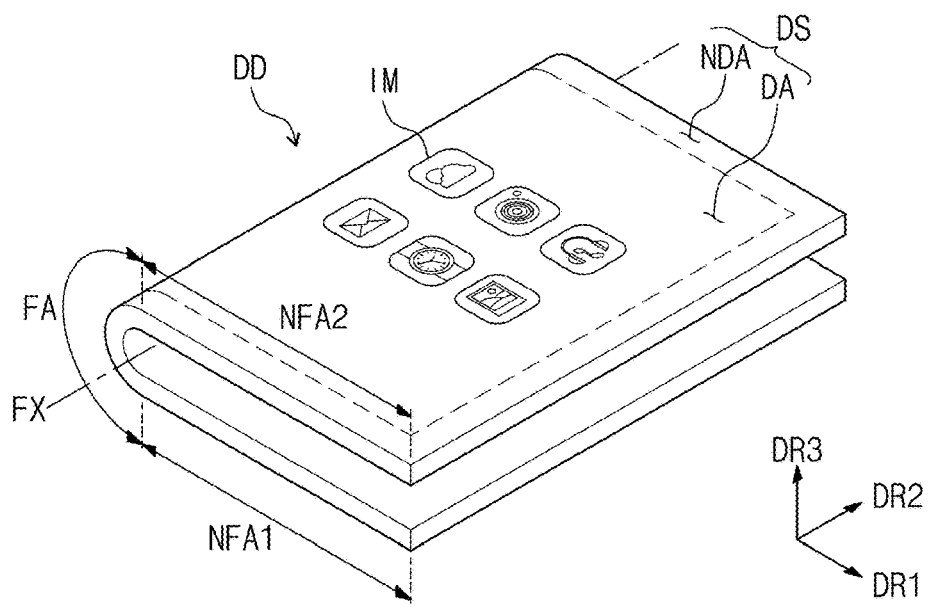
FIG. 2 is a view illustrating a folding state of the display device illustrated in FIG. 1.

FIG. 1 is a perspective view of an exemplary embodiment of a display device according to the invention. FIG. 2 is a view illustrating a folding state of the display device illustrated in FIG. 1.

Referring to FIG. 1, a display device DD in an exemplary embodiment of the invention may have a rectangular shape having long sides in a first direction DR1 and having short sides in a second direction DR2 crossing the first direction DR1. However, the invention is not limited thereto, and the display device DD may have various shapes such as a circle and a polygon. The display device DD may be a flexible display device.

Hereinafter, a direction substantially perpendicularly crossing the plane defined by the first direction DR1 and the second direction DR2 is defined as a third direction DR3. In this description, the meaning of "in a plan view" may mean a view seen in the third direction DR3.

The display device DD may include a first non-folding area NFA1, a second non-folding area NFA2, and a folding area FA disposed between the first non-folding area NFA1 and the second non-folding area NFA2. The first non-folding area NFA1, the second non-folding area NFA2, and the folding area FA may be arranged in the first direction DR1.

As an example, one folding area FA and two non-folding areas NFA1 and NFA2 are illustrated, but the number of the folding area FA and the non-folding areas NFA1 and NFA2 are not limited thereto. In other exemplary embodiments, the display device DD may include more than two, for example, non-folding areas and folding areas disposed between the non-folding areas.

The top surface of the display device DD may be defined as a display surface DS, and may have a plane defined by the first direction DR1 and the second direction DR2. Through the display surface DS, images IM generated in the display device DD may be provided to a user.

The display surface DS may include a display area DA and a non-display area NDA adjacent to the display area DA. The display area DA may display images, and the non-display area NDA may not display images. The non-display area NDA surrounds the display area DA, and may define an edge, printed with a predetermined color, of the display device DD.

Referring to FIG. 2, the display device DD may be a folding-type (foldable) display device DD which is folded or unfolded. In an exemplary embodiment, the folding area FA is bent with respect to a folding axis FX parallel to the second direction DR2, and thus the display device DD may be folded. The folding axis FX may be defined as a short axis parallel to the short sides of the display device DD, for example.

The display device DD may be out-folded so that the display surface DS is exposed to the outside. Thus, when the display device DD is folded, a display surface of the first non-folding area NFA1 and a display surface of the second non-folding area NFA2 may be disposed to be opposite to each other.

Figure 3:
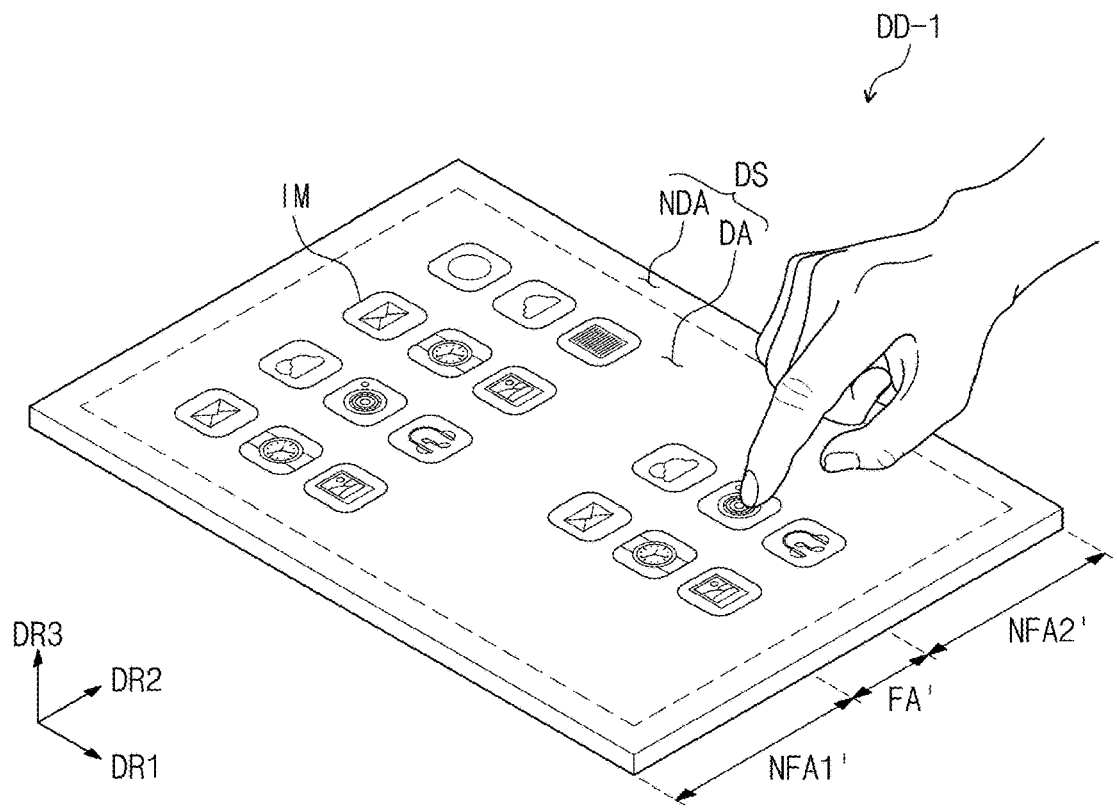
FIG. 3 is a perspective view of an exemplary embodiment of a display device according to the invention.
Figure 4:
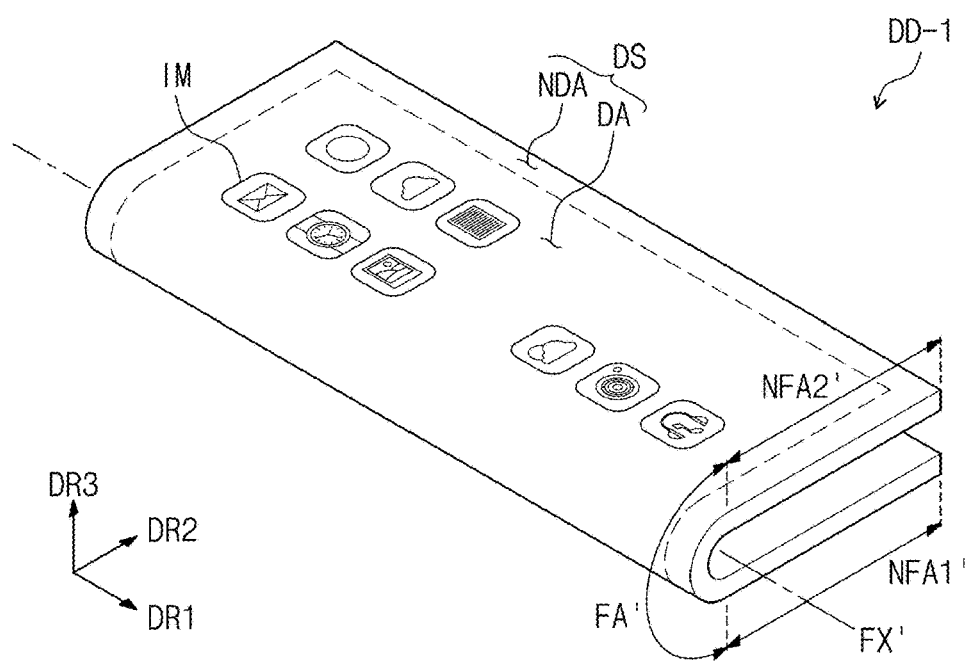
FIG. 4 is a view illustrating a folding state of the display device illustrated in FIG. 3.

FIG. 3 is a perspective view of an exemplary embodiment of a display device according to the invention. FIG. 4 is a view illustrating a folding state of the display device illustrated in FIG. 3.

Except for a folding operation, a display device DD_1 illustrated in FIG. 3 may have the substantially same configuration as the display device DD illustrated in FIG. 1.

Thus, the folding operation of the display device DD_1 will be mainly described hereinafter.

Referring to FIGS. 3 and 4, the display device DD_1 may include a first non-folding area NFA1', a second non-folding area NFA2', and a folding area FA' disposed between the first non-folding area NFA1' and the second non-folding area NFA2'. The first non-folding area NFA1', the second non-folding area NFA2', and the folding area FA' may be arranged in a second direction DR2.

The folding area FA' is bent with respect to a folding axis FX' parallel to a first direction DR1, and thus the display device DD_1 may be folded. The folding axis FX' may be defined as a long axis parallel to long sides of the display device DD_1. The display device DD illustrated in FIG. 1 may be folded with respect to the short axis, and the display device DD_1 illustrated in FIG. 3 may be folded with respect to the long axis. The display device DD_1 may be folded so that a display surface DS is exposed to the outside.

Hereinafter, a structure of the display device DD folded with respect to the short axis will be described. However, the invention is not limited thereto, and structures described hereinafter may be also applied to the display device DD_1 folded with respect to the long axis.

Figure 5:
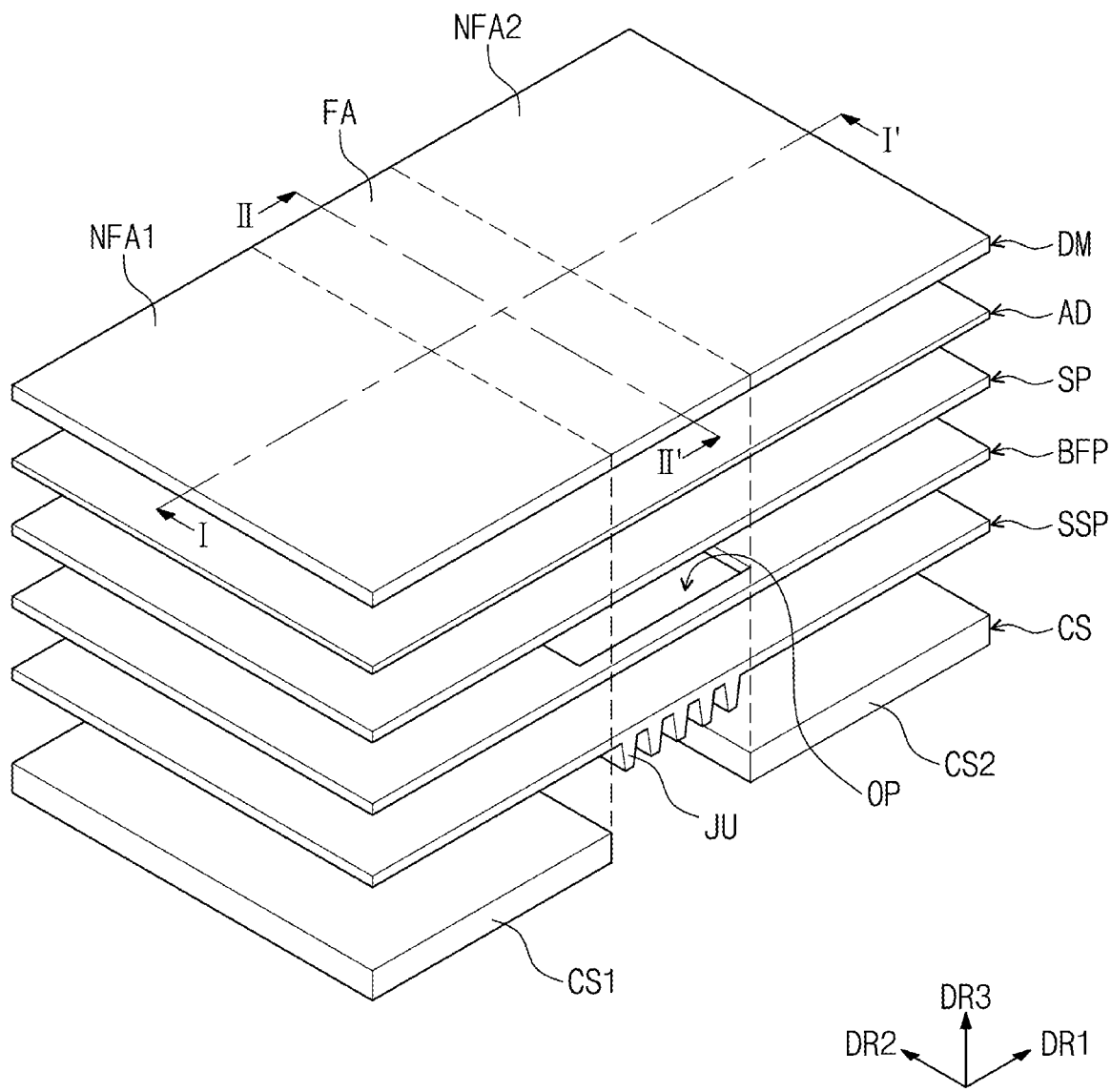
FIG. 5 is an exploded perspective view of an exemplary embodiment of a display device according to the invention.
Figure 6:
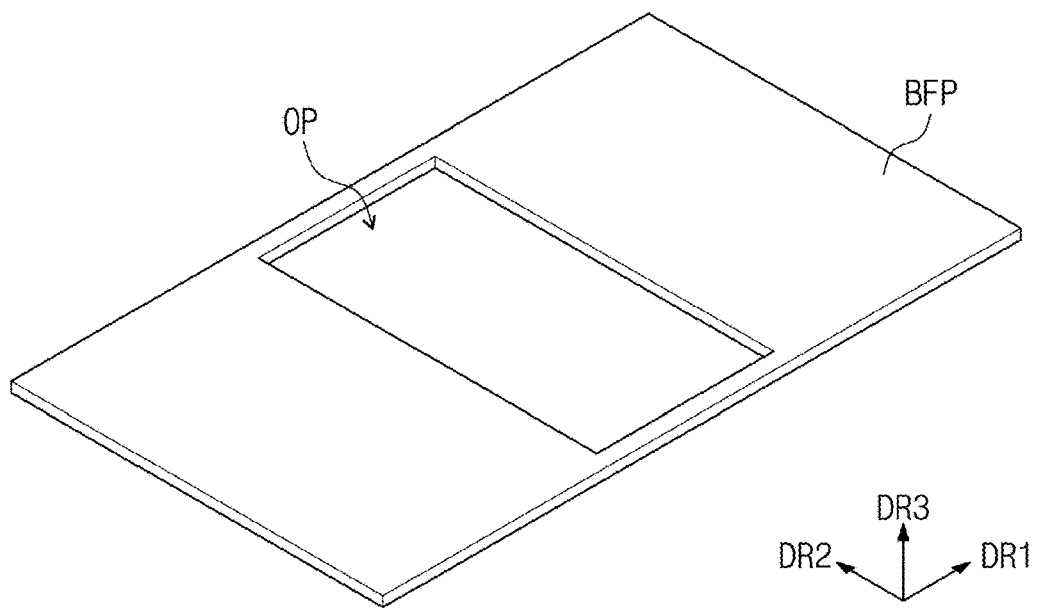
FIG. 6 is a perspective view of the buffer portion illustrated in FIG. 5.
Figure 7:
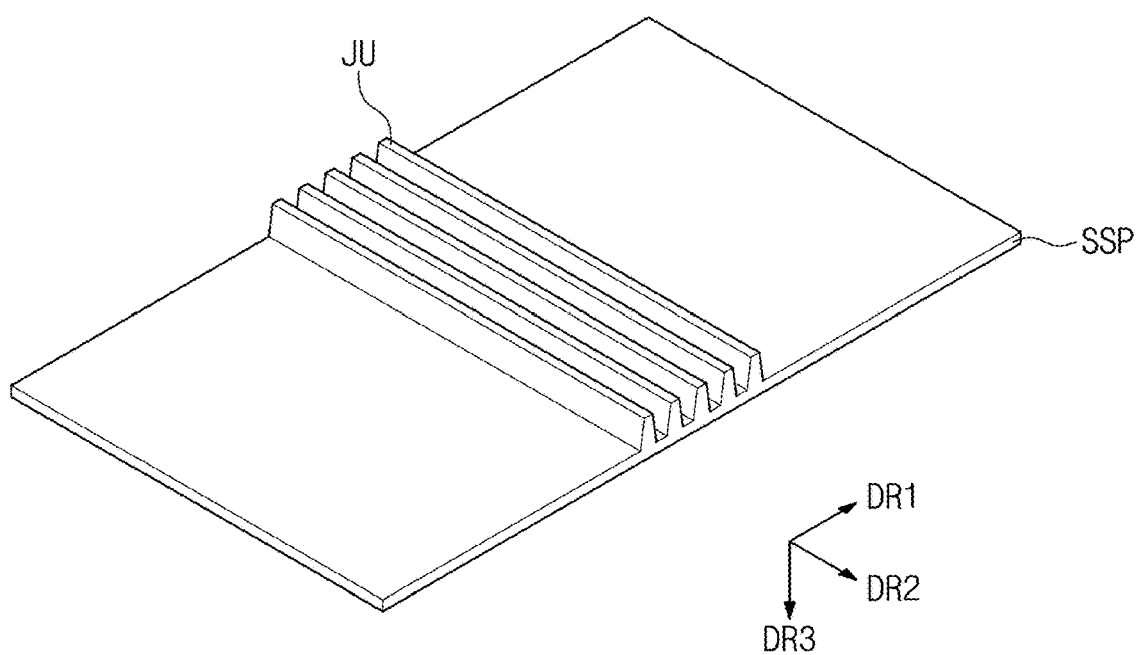
FIG. 7 is a perspective view of the joint units illustrated in FIG. 5.

FIG. 5 is an exploded perspective view of an exemplary embodiment of a display device according to the invention. FIG. 6 is a perspective view of the buffer portion illustrated in FIG. 5. FIG. 7 is a perspective view of the joint units illustrated in FIG. 5.

For convenience of explanation, the sub-support SSP and the joint units JU in FIG. 7 are illustrated upside down when compared to FIG. 5.

Referring to FIG. 5, a display device DD in an exemplary embodiment of the invention may include a display module DM, an adhesive AD, a support SP, a sub-support SSP, a buffer portion BFP, a plurality of joint units JU, and a case CS (or a housing).

The display module DM may have a plane defined by first and second directions DR1 and DR2. The display module DM may have a rectangular shape having long sides in the first direction DR1 and having short sides in the second direction DR2.

Like the display device DD, the display module DM may include a first non-folding area NFA1, a second non-folding area NFA2, and a folding area FA disposed between the first non-folding area NFA1 and the second non-folding area NFA2. The first and second non-folding areas NFA1 and NFA2 and the folding area FA may be arranged in the first direction DR1.

The support SP may have a rectangular shape having long sides in the first direction DR1 and short sides in the second direction DR2. The support SP is disposed below the display module DM, and may support the display module DM.

The adhesive AD may be disposed between the display module DM and the support SP. The display module DM and the support SP may be attached to each other by the adhesive AD. The adhesive AD may include a pressure sensitive adhesive, but this is described as an example. The adhesive AD may include various adhesives in addition to the pressure sensitive adhesive.

The sub-support SSP may have a rectangular shape having long sides in the first direction DR1 and short sides in the second direction DR2. The sub-support SSP may be disposed below the support SP.

The buffer portion BFP may have a rectangular shape having long sides in the first direction DR1 and short sides in the second direction DR2. The buffer portion BFP may be disposed between the support SP and the sub-support SSP.

Referring to FIGS. 5 and 6, an opening OP overlapping the folding area FA may be defined in the buffer portion BFP. The opening OP may be defined by removing a predetermined portion of a central section of the buffer portion BFP. In a plan view, the opening OP may have a rectangular shape. However, the invention is not limited thereto, and may have various shapes such as a circle, an oval, and a polygon.

Referring to FIGS. 5 and 7, the joint units JU may be disposed below the sub-support SSP. The joint units JU may overlap the folding area FA. The joint units JU may extend in the second direction DR2 and be arranged in the first direction DR1. The joint units JU may be spaced a predetermined distance from each other in the first direction DR1.

Referring to FIG. 5, the case CS may be disposed below the sub-support SSP. The case CS may include a first case CS1 disposed below the sub-support SSP to overlap the first non-folding area NFA1 and a second case CS2 disposed below the sub-support SSP to overlap the second non-folding area NFA2.

Although not illustrated, the display device DD may further include a hinge part which is connected to the first and second cases CS1 and CS2 to provide a folding axis FX extending in the second direction DR2.

Figure 8:
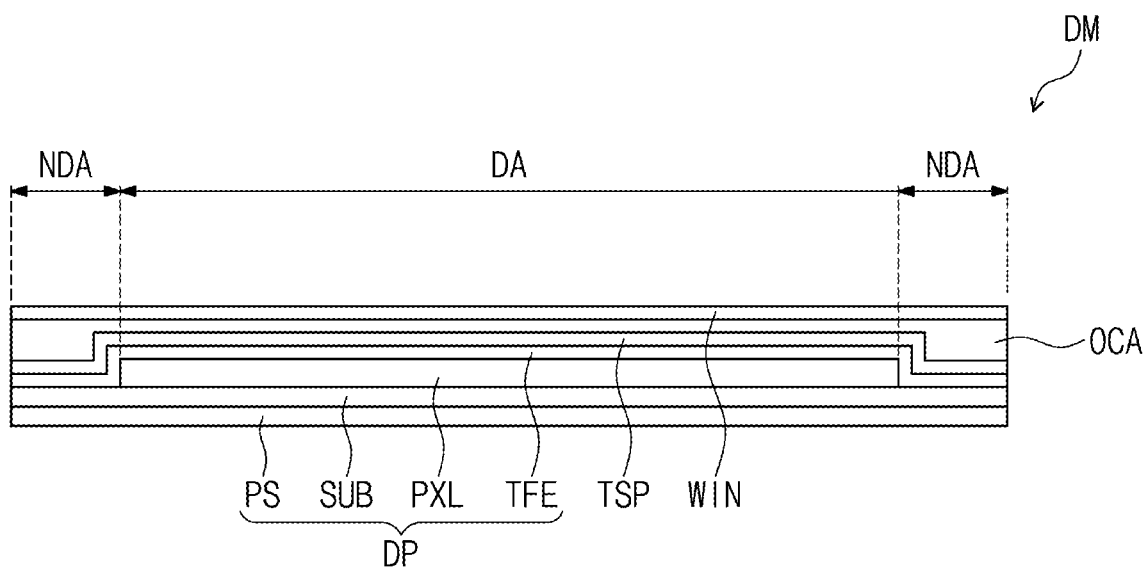
FIG. 8 is a view schematically showing a cross-section of the display module illustrated in FIG. 5.

FIG. 8 is a view schematically showing a cross-section of the display module illustrated in FIG. 5.

Referring to FIG. 8, the display module DM may include a display panel DP, a touch sensing part TSP disposed on the display panel DP, a window WIN disposed on the touch sensing part TSP, and an adhesive OCA disposed between the touch sensing part TSP and the window WIN.

The display panel DP according to the exemplary embodiment of the invention may be a light emitting-type display panel, but is not particularly limited thereto. In an exemplary embodiment, the display panel DP may be an organic light emitting display panel or a quantum-dot light emitting display panel, for example. A light emitting layer of the organic light emitting display panel may include an organic light emitting material. A light emitting layer of the quantum-dot light emitting display panel may include quantum dot, quantum rods, or the like. Hereinafter, the display panel DP is described as the organic light emitting display panel.

The display panel DP may include a substrate SUB, a pixel layer PXL disposed on the substrate SUB, a thin film encapsulation layer TFE disposed on the substrate SUB to cover the pixel layer PXL, and a protection substrate PS disposed below the substrate SUB. The substrate SUB may include a flexible plastic substrate as a transparent substrate. In an exemplary embodiment, the substrate SUB may include polyimide ("PI"), for example.

Like the display surface DS of the display device DD, the substrate SUB may include a display area DA and a non-display area NDA adjacent to the display area DA. The pixel layer PXL may be disposed on the display area DA. The pixel layer PXL may include a plurality of pixels, and each of the pixels may include a light emitting element.

The thin film encapsulation layer TFE may include at least two inorganic layers and an organic layer disposed between the inorganic layers. The inorganic layers include an inorganic material, and may protect the pixel layer PXL against moisture/oxygen. The organic layers include an organic material, and may protect the pixel layer PXL against impurities such as dust particles.

The protection substrate PS may protect a lower portion of the substrate SUB. The protection substrate PS may include a flexible plastic substrate. In an exemplary embodiment, the protection substrate PS may include polyethylene terephthalate ("PET"), for example.

The touch sensing part TSP may detect an external input (a hand of a user, a touch pen, or the like), change the input into a predetermined input signal, and provide the input signal to the display panel DP. The touch sensing part TSP may include a plurality of touch sensor parts (not shown) for detecting the external input. The touch sensor parts may detect the external input in a capacitive method. The display panel DP may receive the input signal from the touch sensing part TSP and generate an image corresponding to the input signal.

The window WIN may protect the display panel DP and the touch sensing part TSP against scratch and impact from the outside. The window WIN may be attached to the touch sensing part TSP by the adhesive OCA. The adhesive OCA may include an optical clear adhesive. The image generated in the display panel DP may pass through the window WIN and then be provided to the user.

Figure 9:
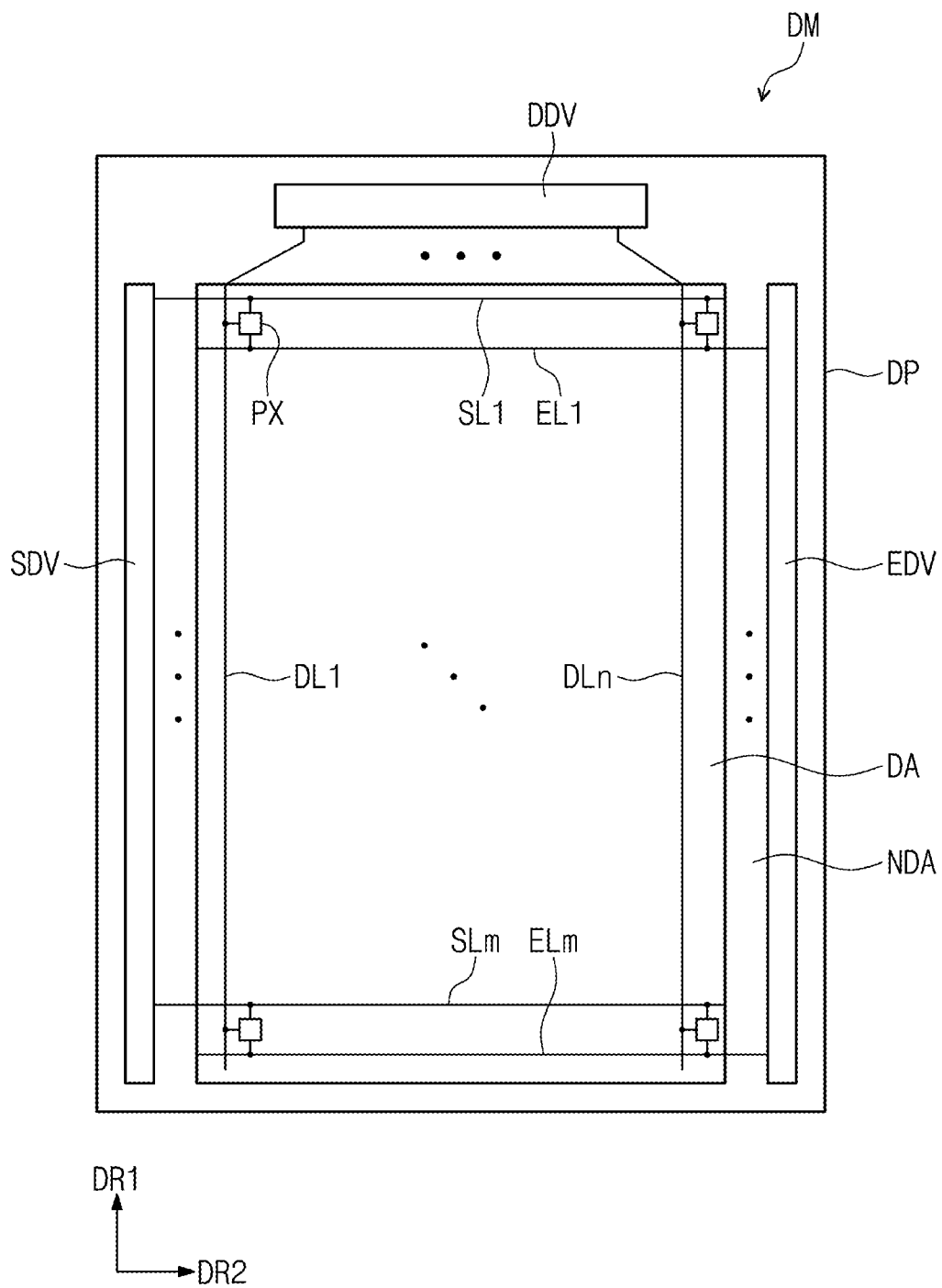
FIG. 9 is a plan view of the display module illustrated in FIG. 8.

FIG. 9 is a plan view of the display module illustrated in FIG. 8.

Referring to FIG. 9, the display module DM in an exemplary embodiment of the invention may include a display panel DP, a scan driver SDV, a data driver DDV, and an emission driver EDV. A planar configuration of the display panel DP is illustrated in FIG. 9 as an example, and a planar configuration of a touch sensing part TSP is omitted.

The display panel DP may be a flexible display panel. The display panel DP may have a rectangular shape having long sides in a first direction DR1 and having short sides in a second direction DR2. Like the display surface DS of the display device DD, the display panel DP may include a display area DA and a non-display area NDA surrounding the display area DA.

The display panel DP may include a plurality of pixels PX, a plurality of scan lines SL1 to SLm, a plurality of data lines DL1 to DLn, and a plurality of light emission lines EL1 to ELm, where m and n are natural numbers. The pixels PX may be disposed in the display area DA, and may be connected to the scan lines SL1 to SLm, the data lines DL1 to DLn, and the light emission line EL1 to ELm.

The scan driver SDV, the data driver DDV, and the emission driver EDV may be disposed in the non-display area NDA. Each of the scan driver SDV and the emission driver EDV may be disposed adjacent to each of the long sides of the display panel DP. The data driver DDV is manufactured in the form of an integrated circuit ("IC") chip, and may be disposed adjacent to one of the short sides of the display panel DP.

The scan lines SL1 to SLm may extend in the second direction DR2 and be connected to the scan driver SDV. The data lines DL1 to DLn may extend in the first direction DR1 and be connected to the data driver DDV. The light emission lines EL1 to ELm may extend in the second direction DR2 and be connected to the emission driver EDV.

The scan driver SDV generates a plurality of scan signals, and the scan signals may be applied to the pixels PX through the scan lines SL1 to SLm. The scan signals may be sequentially applied to the pixels PX. The data driver DDV generates a plurality of data voltages, and the data voltage may be applied to the pixels PX through the data lines DL1 to DLn. The emission driver EDV generates a plurality of light emission signals, and the light emission signals may be applied to the pixels PX through the light emission lines EL1 to ELm.

Although not illustrated, the display module DM may include a timing controller (not shown) for controlling the operations of the scan driver SDV, the data driver DDV, and the emission driver EDV.

The pixels PX may receive the data voltages in response to the scan signals. The pixels PX may display an image by emitting light, having luminance corresponding to the data voltages, in response to the light emission signals. Light emission times of the pixels PX may be controlled by the light emission signals.

Figure 10:
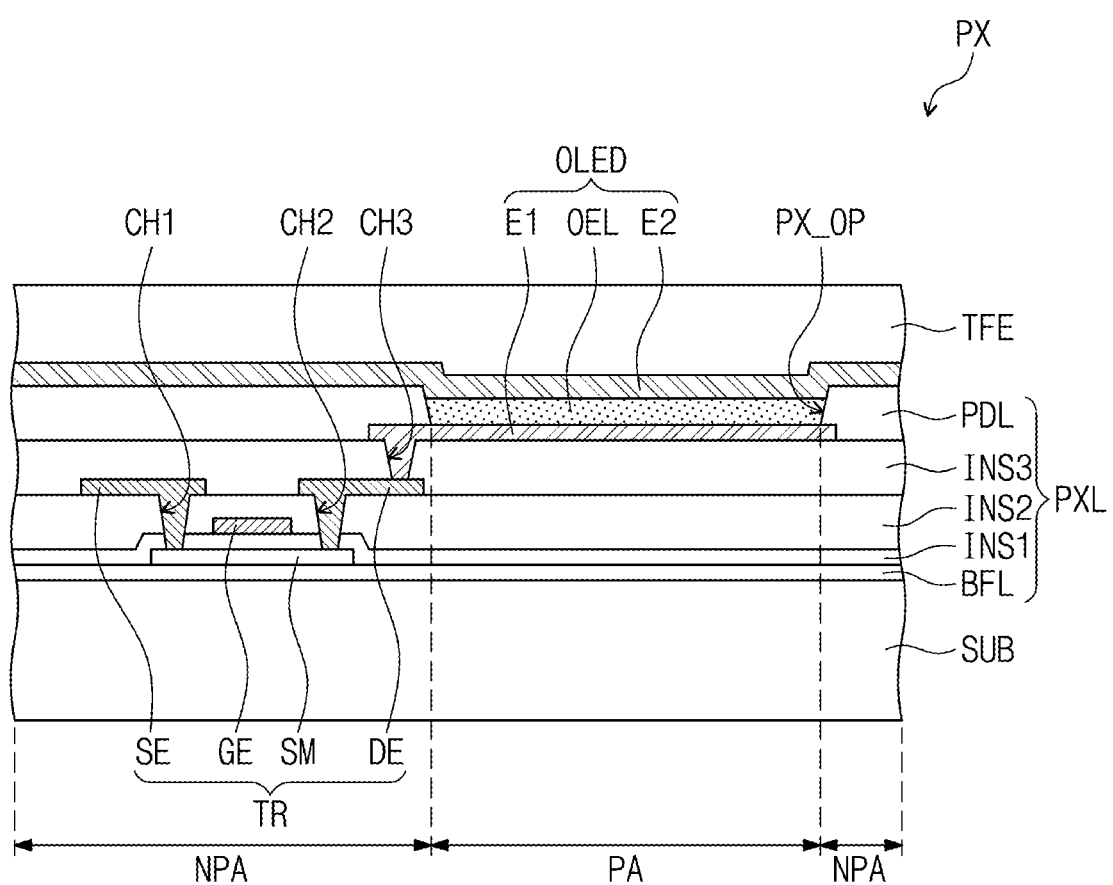
FIG. 10 is a view schematically illustrating a cross-sectional configuration of one pixel illustrated in FIG. 9.

FIG. 10 is a view schematically illustrating a cross-sectional configuration of one pixel illustrated in FIG. 9.

Referring to FIG. 10, the pixel PX may include an organic light emitting element OLED and a transistor TR connected to the organic light emitting element OLED. The organic light emitting element OLED may include a first electrode E1, a second electrode E2, and an organic light emitting layer OEL disposed between the first electrode E1 and the second electrode E2.

The first electrode E1 may be an anode electrode, and the second electrode E2 may be a cathode electrode. The first electrode E1 may be defined as a pixel electrode, and the second electrode E2 may be defined as a common electrode.

The pixel PX may be divided into a pixel area PA and a non-pixel area NPA in the vicinity of the pixel area PA. The organic light emitting element OLED may be disposed in the pixel area PA, and the transistor TR may be disposed in the non-pixel area NPA. The transistor TR and the organic light emitting element OLED may be disposed on a substrate SUB. A buffer layer BFL is disposed on the substrate SUB, and the buffer layer BFL may include an inorganic material.

A semiconductor layer SM of the transistor TR may be disposed on the buffer layer BFL. The semiconductor layer SM may include an organic semiconductor or a semiconductor that has an inorganic material such as amorphous silicon or poly-silicon. Also, the semiconductor layer SM may include an oxide semiconductor. Although not illustrated in FIG. 10, the semiconductor layer SM may include a source area, a drain area, and a channel area between the source area and the drain area.

A first insulating layer INS1 may be disposed on the buffer layer BFL to cover the semiconductor layer SM. The first insulating layer INS1 may include an inorganic material. A gate electrode GE of the transistor TR overlapping the semiconductor layer SM may be disposed on the first insulating layer INS1. The gate electrode GE may be disposed to overlap the channel area of the semiconductor layer SM.

A second insulating layer INS2 may be disposed on the first insulating layer INS1 to cover the gate electrode GE. The second insulating layer INS2 may include an organic material and/or an inorganic material.

A source electrode SE and a drain electrode DE of the transistor TR may be disposed spaced apart from each other on the second insulating layer INS2. The source electrode SE may be connected to the source area of the semiconductor layer SM via a first contact hole CH1 defined in the first insulating layer INS1 and the second insulating layer INS2. The drain electrode DE may be connected to the drain area of the semiconductor layer SM via a second contact hole CH2 defined in the first insulating layer INS1 and the second insulating layer INS2.

A third insulating layer INS3 may be disposed on the second insulation layer INS2 to cover the source electrode SE and the drain electrode DE of the transistor TR. The third insulating layer INS3 may be defined as a planarization film and may include an organic material.

The first electrode E1 may be disposed on the third insulating layer INS3. The first electrode E1 may be connected to the drain electrode DE of the transistor TR via a third contact hole CH3 defined in the third insulating layer INS3.

A pixel defining layer PDL that exposes a predetermined portion of the first electrode E1 may be disposed on the first electrode E1 and the third insulating layer INS3. An opening PX_OP for exposing the predetermined portion of the first electrode E1 may be defined in the pixel defining layer PDL.

The organic light emitting layer OEL may be disposed on the first electrode E1 inside the opening PX_OP. The organic light emitting layer OEL may generate one light among red, green, and blue light. However, the invention is not limited thereto, and the organic light emitting layer OEL may generate white light by the combination of organic materials that generate red, green, and blue light.

The second electrode E2 may be disposed on the pixel defining layer PDL and the organic light emitting layer OEL. A thin film encapsulation layer TFE may be disposed on the organic light emitting element OLED to cover the pixel PX. A layer between the substrate SUB and the thin film encapsulation layer TFE may be defined as a pixel layer PXL.

A first voltage may be applied to the first electrode E1, and a second voltage may be applied to the second electrode E2. A hole and an electron injected into the organic light emitting layer OEL are coupled to each other to form exciton, and the organic light emitting element OLED may emit light as the exciton is transited to a ground state. The organic light emitting element OLED may emit red, green, or blue light according to a flow of current, whereby an image may be displayed.

Figure 11:
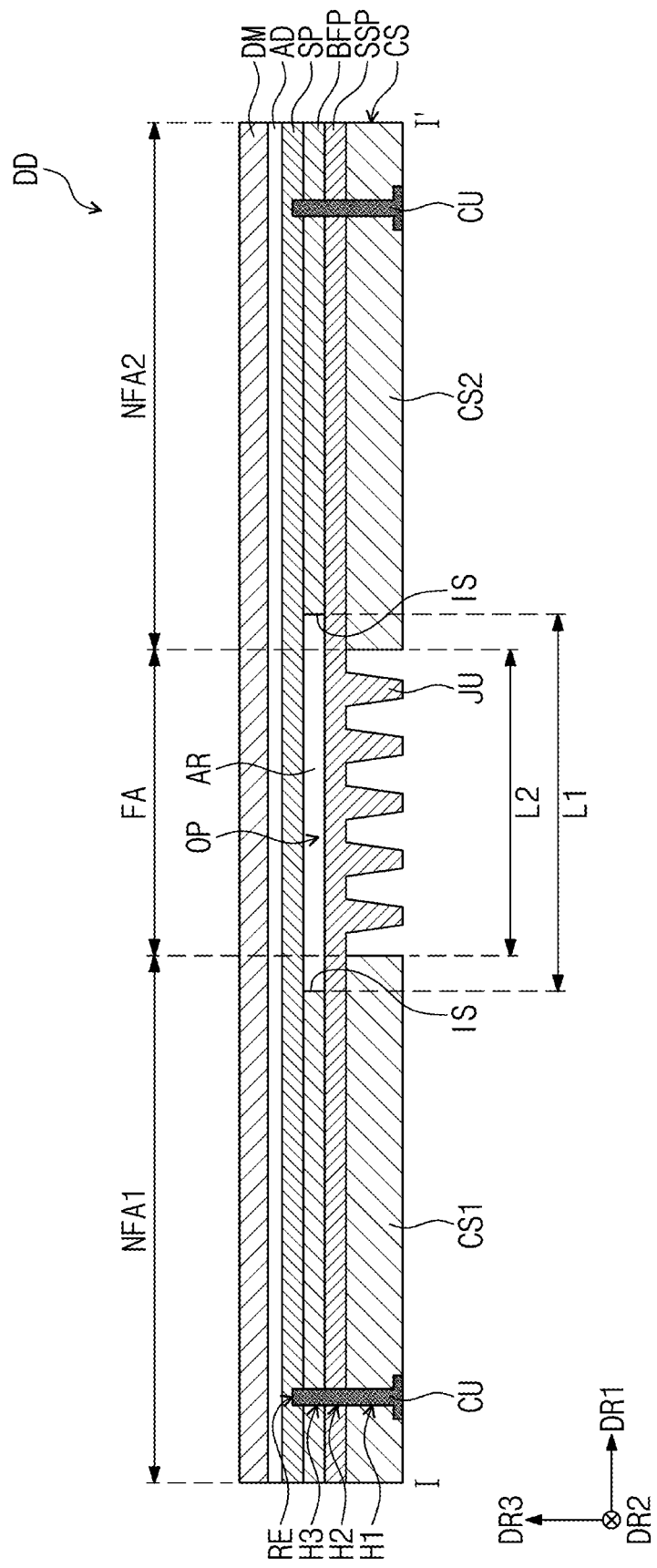
FIG. 11 is a cross-sectional view taken along line I-I' illustrated in FIG. 5.
Figure 12:
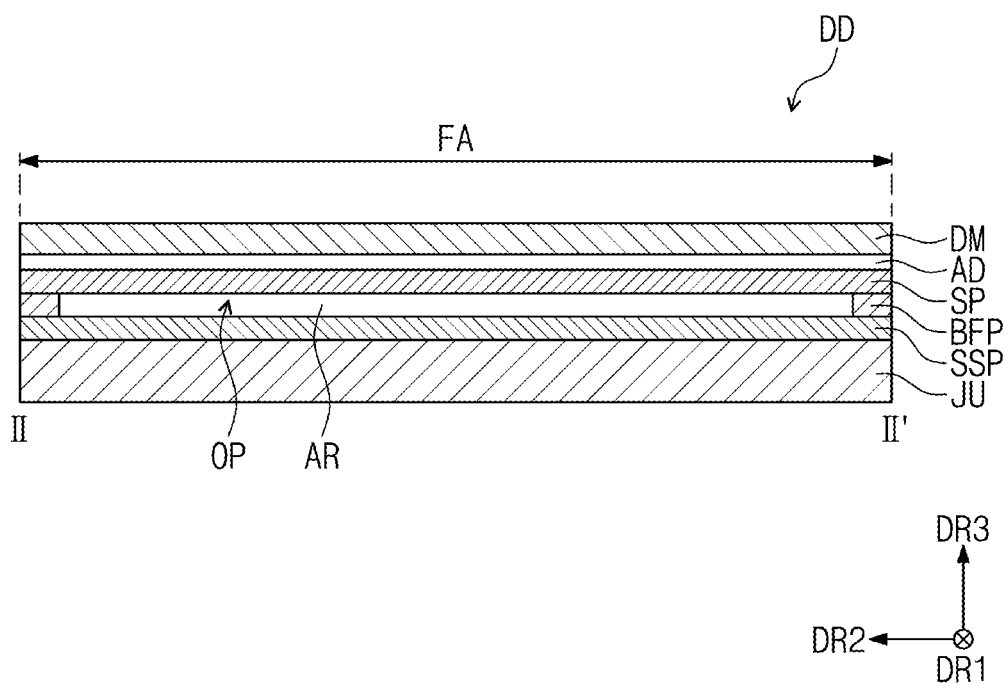
FIG. 12 is a cross-sectional view taken along line II-II' illustrated in FIG. 5.

FIG. 11 is a cross-sectional view taken along line I-I' illustrated in FIG. 5. FIG. 12 is a cross-sectional view taken along line II-II' illustrated in FIG. 5.

FIGS. 11 and 12 illustrate coupled states of the display module DM, the adhesive AD, the support SP, the sub-support SSP, the buffer portion BFP, the joint units JU, and the case CS.

Referring to FIGS. 11 and 12, the support SP may be attached to the display module DM by the adhesive AD. The support SP may be disposed between the adhesive AD and the sub-support SSP. The support SP may have a first modulus. The modulus may be defined as a coefficient of elasticity (Young's modulus) indicating a ratio of stress and strain.

The buffer portion BFP may include a flexible material. In an exemplary embodiment, the buffer portion BFP may include rubber, for example. The buffer portion BFP may be coated on the bottom surface of the support SP, which is opposite to a top surface of the support SP attached to the adhesive AD. In an exemplary embodiment, liquid phase rubber is applied on the bottom surface of the support SP and then cured, whereby the buffer portion BFP may be provided, for example.

A length L1 of the opening OP may be greater than a length L2 of the folding area FA in the first direction DR1. When viewed in the second direction DR2, a boundary of the opening OP is adjacent to a boundary of the folding area FA and may be disposed outside the boundary of the folding area FA.

When viewed in the second direction DR2, the boundary of the opening OP may be an inner surface IS of the buffer portion BFP in which the opening OP is defined. The boundary of the folding area FA may be a boundary between the first non-folding area NFA1 and the folding area FA and a boundary between the second non-folding area NFA2 and the folding area FA.

Referring to FIG. 12, when viewed in the first direction DR1, the opening OP may be defined by inner surfaces, opposite to each other in the second direction DR2, of the buffer portion BFP.

Referring to FIG. 11, the opening OP may be defined as a space sealed by the support SP and the sub-support SSP. The space of the sealed opening OP may be defined as an air layer AR.

The sub-support SSP may have a second modulus lower than the first modulus. In an exemplary embodiment, the support SP may include a metal, and the sub-support SSP may include a plastic material, for example. The metal may have a higher modulus than the plastic material.

The support SP may include an invar that is an alloy of an iron and nickel, but this is described as an example. The support SP may include various metals. In an exemplary embodiment, the sub-support SSP may include PI, polycarbonate ("PC"), acrylonitrile butadiene styrene copolymer ("ABS") plastic, or the like, for example. However, this is described as an example, and the sub-support SSP may include various plastic materials.

The joint units JU may be disposed between the first case CS1 and the second case CS2. In the first direction DR1, the width of each of the joint units JU may decrease from the top to the bottom of each of the joint units JU. In an exemplary embodiment, when viewed in the second direction DR2, each of the joint units JU may have a reverse trapezoidal shape, for example.

However, this is described as an example, and the joint units JU may have various shapes as long as the width of each of the joint units JU decrease from the top to the bottom of each of the joint units JU.

The joint units JU may include the same material as that of the sub-support SSP. The joint units JU may be unitary with the sub-support SSP. The joint units JU may protrude downward from a portion of the sub-support SSP overlapping the folding area FA.

The sub-support SSP and the joint units JU may be provided at the same time, using the same plastic material. However, the invention is not limited thereto, and the joint units JU are manufactured separately and may be attached to a lower portion of the sub-support SSP.

The display device DD may further include a plurality of coupling units CU for connecting the first and second cases CS1 and CS2 to the sub-support SSP, the buffer portion BFP, and the support SP. In an exemplary embodiment, a first hole H1 may be defined in each of the first and second cases CS1 and CS2, and a second hole H2 overlapping the first hole H1 may be defined in the sub-support SSP, for example. A third hole H3 overlapping the second hole H2 may be defined in the buffer portion BFP, and a recess part RE overlapping the third hole H3 may be defined in the bottom surface of the support SP.

Each of the coupling units CU is inserted into the first hole H1, the second hole H2, the third hole H3, and the recess part RE, and may connect the first and second cases CS1 and CS2 to the sub-support SSP, the buffer portion BFP, and the support SP. In an exemplary embodiment, the coupling unit CU may be realized as a screw type, for example. The plurality of coupling units CU may be provided in each of the first and second cases CS1 and CS2.

The first and second cases CS1 and CS2 may be connected to the sub-support SSP, the buffer portion BFP, and the support SP by the coupling units CU, but the invention is not limited thereto. In an exemplary embodiment, an additional adhesive may be disposed between the first and second cases CS1 and CS2 and the sub-support SSP, and the first and second cases CS1 and CS2 may be connected to the sub-support SSP by the adhesive, for example. Also, the sub-support SSP may be connected to the buffer portion BFP by an additional adhesive.

When the support SP including metal is substantially thick, a folding operation of the display device DD may be difficult. Thus, the support SP may have the thickness making possible that the folding operation of the display device DD is easily performed. In an exemplary embodiment, the support SP may have a thickness of about 40 micrometers (μm) to about 50 μm along the third direction DR3, for example.

In the third direction DR3, the thickness of each of the joint units JU may be equal to the thickness of each of the first and second cases CS1 and CS2. However, this is described as an example, and in another exemplary embodiment, the thickness of each of the joint units JU may be different from the thickness of each of the first and second cases CS1 and CS2.

Figure 13:
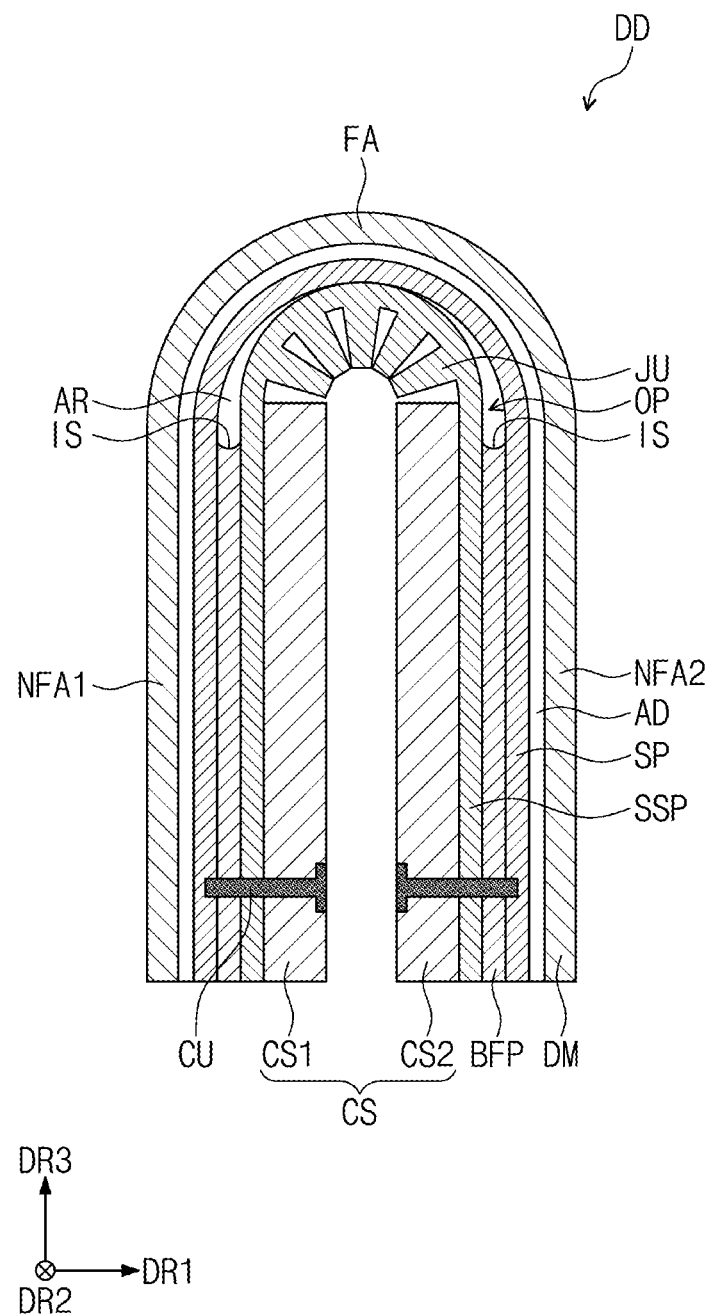
FIG. 13 is a view illustrating a folding state of the display device illustrated in FIG. 11.

FIG. 13 is a view illustrating a folding state of the display device illustrated in FIG. 11.

Referring to FIG. 13, the first case CS1 and the second case CS2 may move to face each other by a hinge part (not shown). The support SP, the buffer portion BFP, and the sub-support SSP may move along with the first case CS1 and the second case CS2, and the display module DM may be out-folded to be exposed to the outside. When the display device DD is folded, the side surfaces of the joint units JU may be disposed adjacent to each other. Opposite sides of lower ends of the joint units JU may be brought into contact with each other.

By a folding operation of the display device DD, the air layer AR in the folding area FA may be compressed. Thus, when the display device DD is folded, a central section of the support SP may be disposed adjacent to a central section of the sub-support SSP. The central section of the support SP may be brought into contact with a central section of the sub-support SSP.

The air layer AR is a sealed space, and thus when the air layer AR is compressed, the inner surface IS, defining the air layer AR, of the buffer portion BFP may be concavely deformed due to the pressure. When the display device DD is unfolded, the inner surface IS of the buffer portion BFP having elasticity may return to the original state.

During the folding operation, stress may be generated in a portion of the display device DD overlapping the folding area FA. The stress may make the folding operation difficult. However, in the exemplary embodiment of the invention, the sub-support SSP having a lower modulus as in plastic may be disposed below the support SP. The sub-support SSP has flexible properties and may relieve the stress.

In a state in which the support SP, the buffer portion BFP, and the sub-support SSP are not provided in the display device DD, the joint units may be manufactured separately and attached directly to the display module DM by an adhesive AD. In the above case, side surfaces of the joint units may be adjacent to each other during the folding operation, and thus compressive stress may be generated in a boundary between upper ends of the neighboring joint units. Specifically, when viewed in the second direction DR2, the compressive stress may be generated at right and left corners of an upper portion of each of the joint units. The compressive stress may be transferred to the display module DM via the adhesive AD. The folding area FA of the display module DM may be deformed due to the compressive stress.

However, in the exemplary embodiment of the invention, the joint units JU are not directly attached to the display module DM by the adhesive AD, but may be disposed below the buffer portion BFP. Since the air layer AR is disposed in the buffer portion BFP overlapping the folding area FA, the compressive stress generated by the joint units JU during the folding operation of the display device DD may not be transferred to the folding area FA. Thus, the deformation of the folding area FA may be prevented.

Also, in the exemplary embodiment of the invention, the support SP having a higher modulus as in metal may be disposed below the display module DM. Even when the sub-support SSP is brought into contact with the support SP during the folding operation of the display device DD, the compressive stress generated in the joint units JU may not be transferred to the display module DM with the help of the support SP having the higher modulus. That is, the compressive stress may be isolated by the support SP.

Consequently, the display device DD according to the exemplary embodiments of the invention may prevent the deformation of the folding area FA due to the compressive stress.

Figure 14:
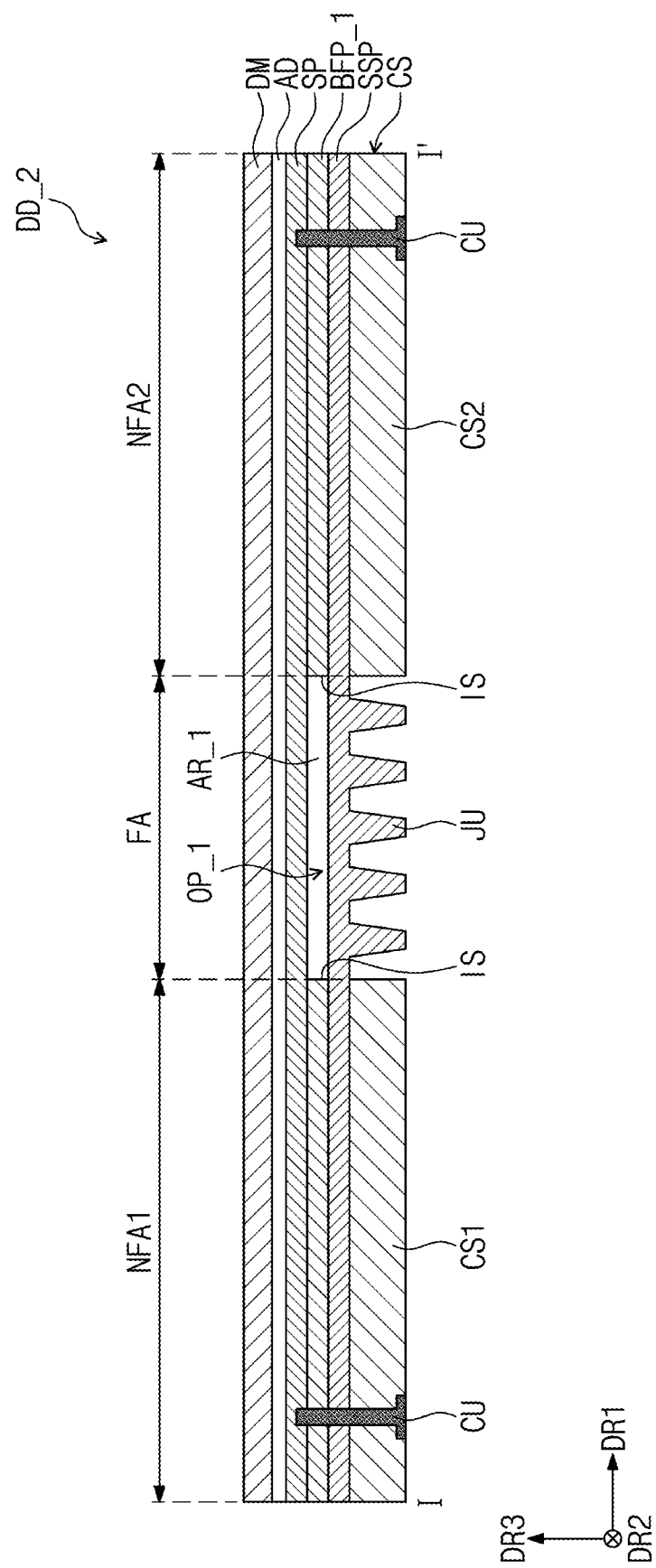
FIGS. 14 and 15 are views illustrating configurations of buffer portions of display devices according to other exemplary embodiments of the invention.
Figure 15:
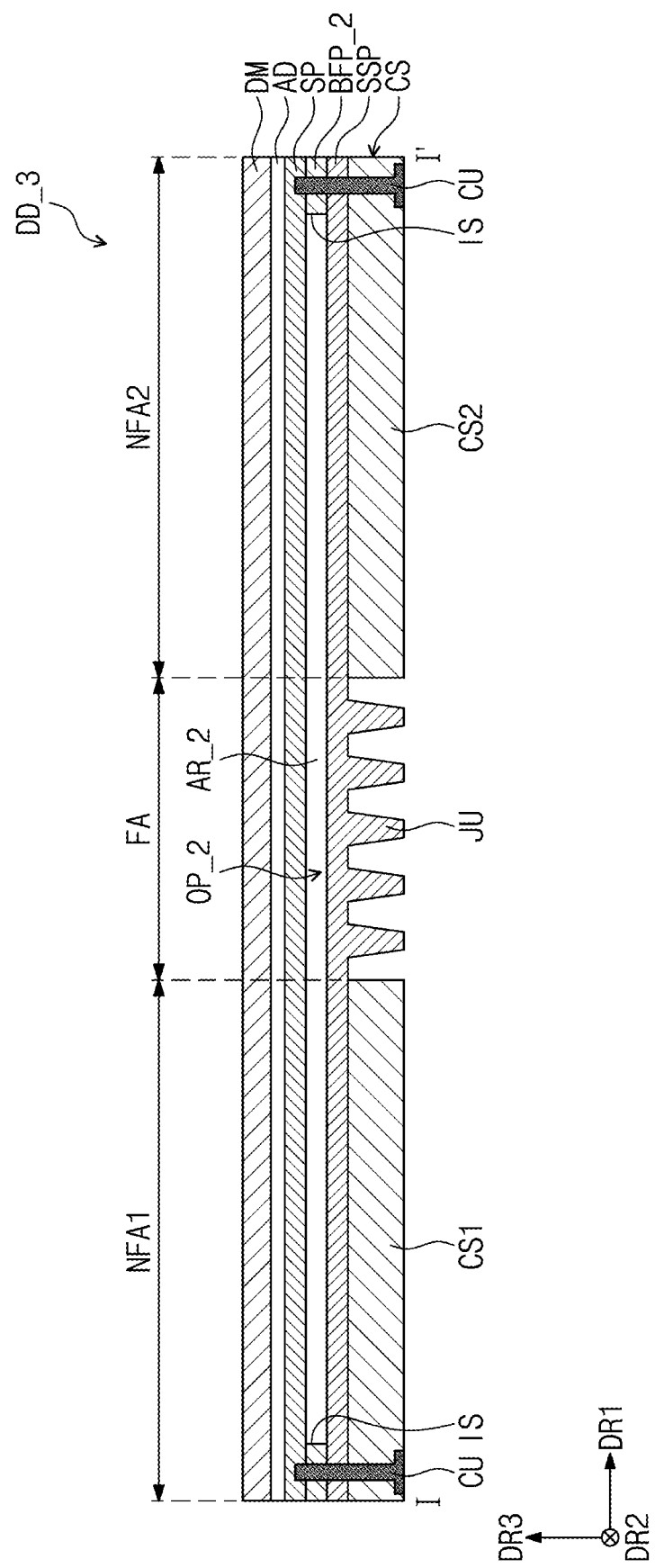

FIGS. 14 and 15 are views illustrating configurations of buffer portions of display devices according to other exemplary embodiments of the invention.

As an example, FIGS. 14 and 15 illustrate cross-sections corresponding to FIG. 11. Except for configurations of buffer portions BFP_1 and BFP_2, configurations of display devices DD_2 and DD_3 are same as the display device DD illustrated in FIG. 11. Thus, the configurations of the buffer portions BFP_1 and BFP_2 will be mainly described hereinafter, but descriptions of other configurations will be omitted. Also, the same components as in the display device DD illustrated in FIG. 11 are illustrated using the same reference symbols.

Referring to FIG. 14, the display device DD_2 may include the buffer portion BFP_1. An opening OP_1 may be defined in the buffer portion BFP_1, and the opening OP_1 closed by the support SP and the sub-support SSP may be defined as an air layer AR_1. When viewed in the second direction DR2, a boundary of the opening OP_1 may overlap a boundary of the folding area FA.

Referring to FIG. 15, the display device DD_3 may include the buffer portion BFP_2. An opening OP_2 may be defined in the buffer portion BFP_2, and the opening OP_2 closed by the support SP and the sub-support SSP may be defined as an air layer AR_2. When viewed in the second direction DR2, a boundary of the opening OP_2 may be more adjacent to each of outer sides of the buffer portion BFP_2 compared to the opening OP_1 of FIG. 14.

The coupling units CU may be adjacent to outer sides of the buffer portion BFP_2. The coupling units CU may be disposed between outer sides of the buffer portion BFP_2 and boundaries of the opening OP_2 (e.g., inner surfaces IS of the buffer portion BFP_2). That is, the opening OP_2 may not be disposed in a portion of the buffer layer in which the coupling units CU are disposed.

The display device in an exemplary embodiment of the invention may prevent the compressive stress, generated in the joint units, from being transferred to the folding area of the display module, and thus may prevent the folding area from being deformed due to the compressive stress.

Although the exemplary embodiments of the invention have been described, it is understood that various changes and modifications may be made by one ordinary skilled in the art within the spirit and scope of the invention as hereinafter claims. Also, the exemplary embodiments described in the invention are not intended to limit the technical ideas of the invention, and all technical ideas within the following claims and their equivalents should be interpreted as being included in the scope of a right of the invention.

What is claimed is:

1. A display device comprising:
   a display module including a first non-folding area, a second non-folding area, and a folding area disposed between the first and second non-folding areas;
   a support disposed below the display module;
   a sub-support disposed below the support;
   a buffer portion which is disposed between the support and the sub-support and in which an opening overlapping the folding area is defined; and
   a plurality of joint units disposed below the sub-support to overlap the folding area.

2. The display device of claim 1, wherein the first and second non-folding areas and the folding area are arranged in a first direction, and
   the opening has a length greater than that of the folding area in the first direction.

3. The display device of claim 2, wherein, when viewed in a second direction crossing the first direction, a boundary of the opening is adjacent to a boundary of the folding area and disposed outside the boundary of the folding area.

4. The display device of claim 3, wherein the opening is defined inside first and second sides of the buffer portion, which are opposite to each other in the second direction.

5. The display device of claim 3, wherein the plurality of joint units extends in the second direction and is spaced apart from each other in the first direction.

6. The display device of claim 5, wherein, when viewed in the second direction, each of the plurality of joint units has a reverse trapezoidal shape.

7. The display device of claim 1, wherein the opening is defined as a space sealed by the support and the sub-support.

8. The display device of claim 1, wherein the buffer portion includes rubber.

9. The display device of claim 1, wherein the buffer portion is coated on a bottom surface of the support.

10. The display device of claim 1, wherein the support has a first modulus, and the sub-support has a second modulus lower than the first modulus.

11. The display device of claim 1, further comprising an adhesive disposed between the display module and the support.

12. The display device of claim 1, wherein the sub-support and the plurality of joint units are unitary with each other.

13. The display device of claim 12, wherein each of the sub-support and the plurality of joint units includes a plastic material.

14. The display device of claim 1, wherein the support includes a metal.

15. The display device of claim 1, the first and second non-folding areas and the folding area are arranged in a first direction,
   the folding area is bent with respect to a folding axis parallel to a second direction crossing the first direction, and
   the display module is out-folded to be exposed to an outside.

16. The display device of claim 1, further comprising:
   a first case disposed below the sub-support to overlap the first non-folding area; and
   a second case disposed below the sub-support to overlap the second non-folding area.

17. The display device of claim 16, wherein the plurality of joint units is disposed between the first case and the second case.

18. The display device of claim 16, further comprising a plurality of coupling units which connect the first and second cases to the sub-support, the buffer portion, and the support.

19. The display device of claim 1, wherein the first and second non-folding areas and the folding area are arranged in a first direction, and
   when viewed in a second direction crossing the first direction, a boundary of the opening overlaps a boundary of the folding area.

20. The display device of claim 1, wherein the first and second non-folding areas and the folding area are arranged in a first direction, and
   when viewed in a second direction crossing the first direction, a boundary of the opening is adjacent to each of first and second sides of the buffer portion.

* * * * *